G. E. HAZARD.
AUTOMOBILE TIRE PUMP.
APPLICATION FILED JAN. 14, 1918.
1,311,693.
Patented July 29, 1919.
5 SHEETS—SHEET 1.
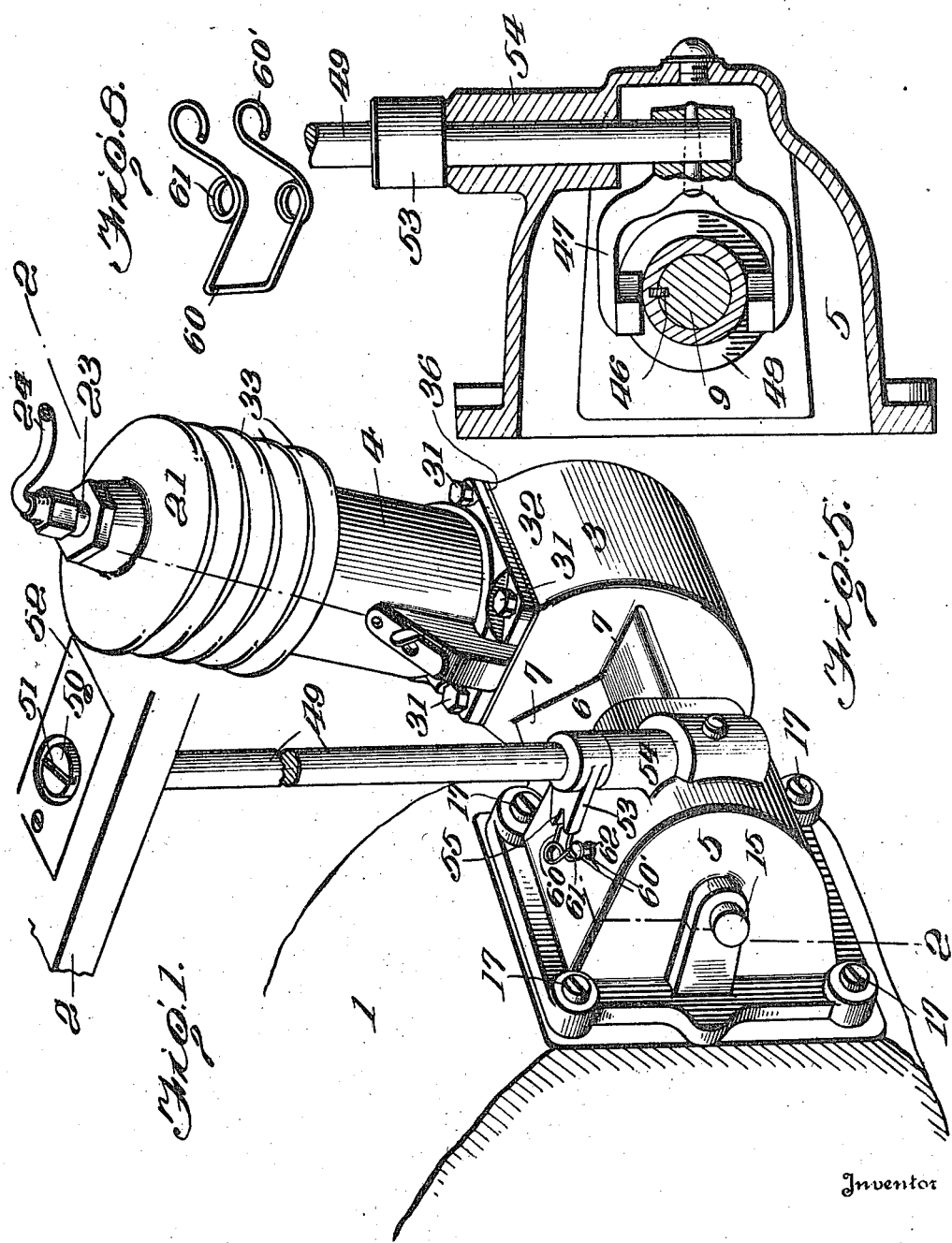

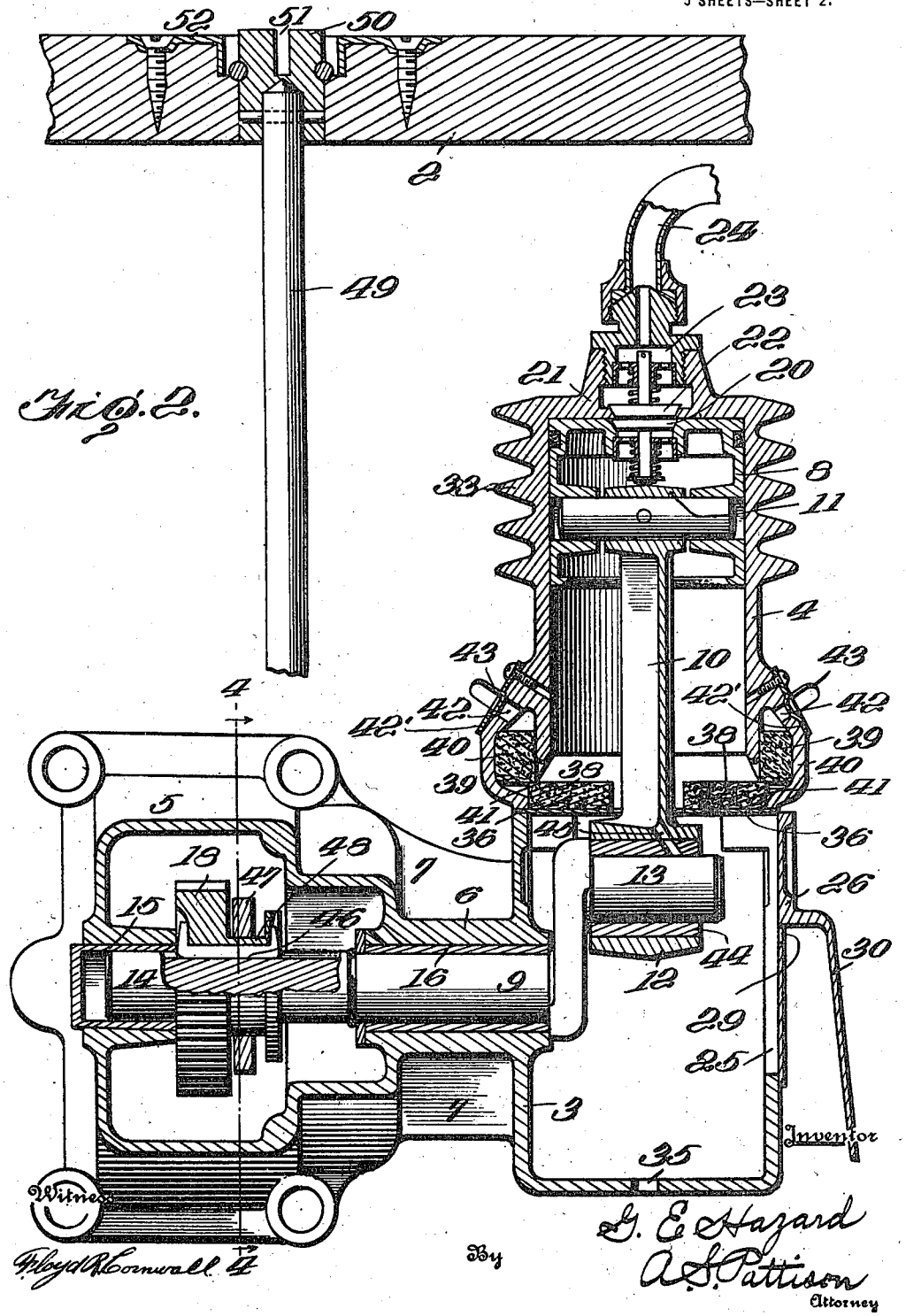

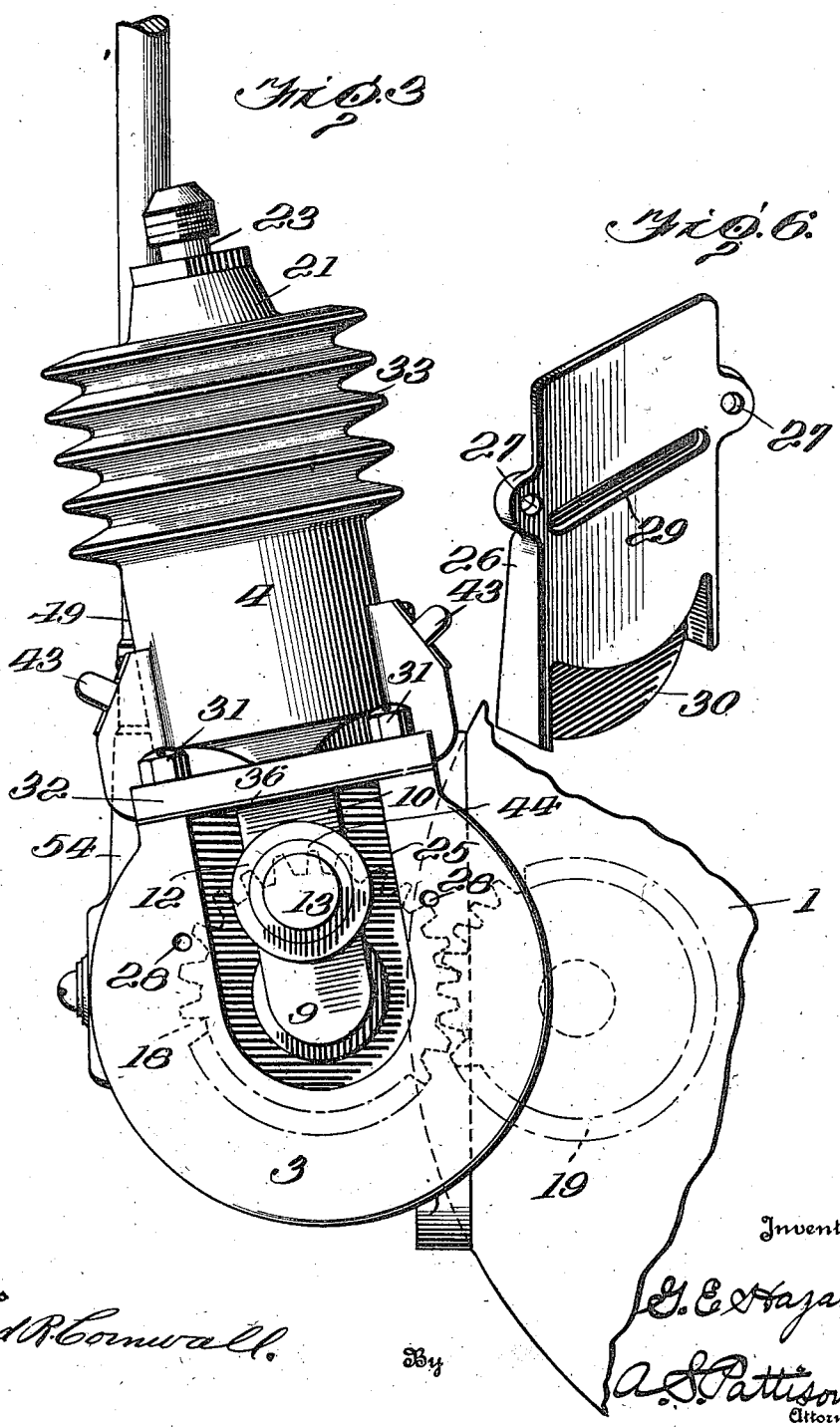

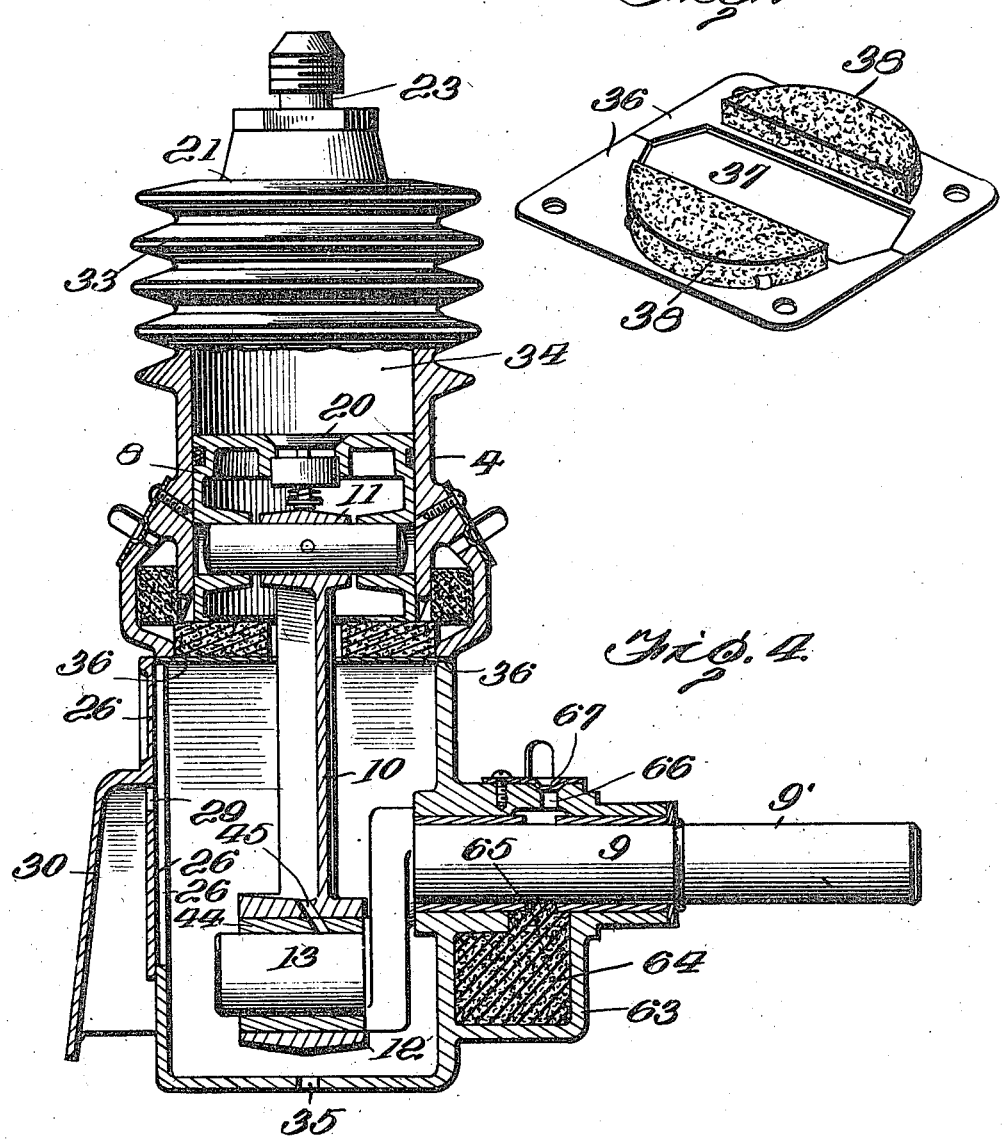

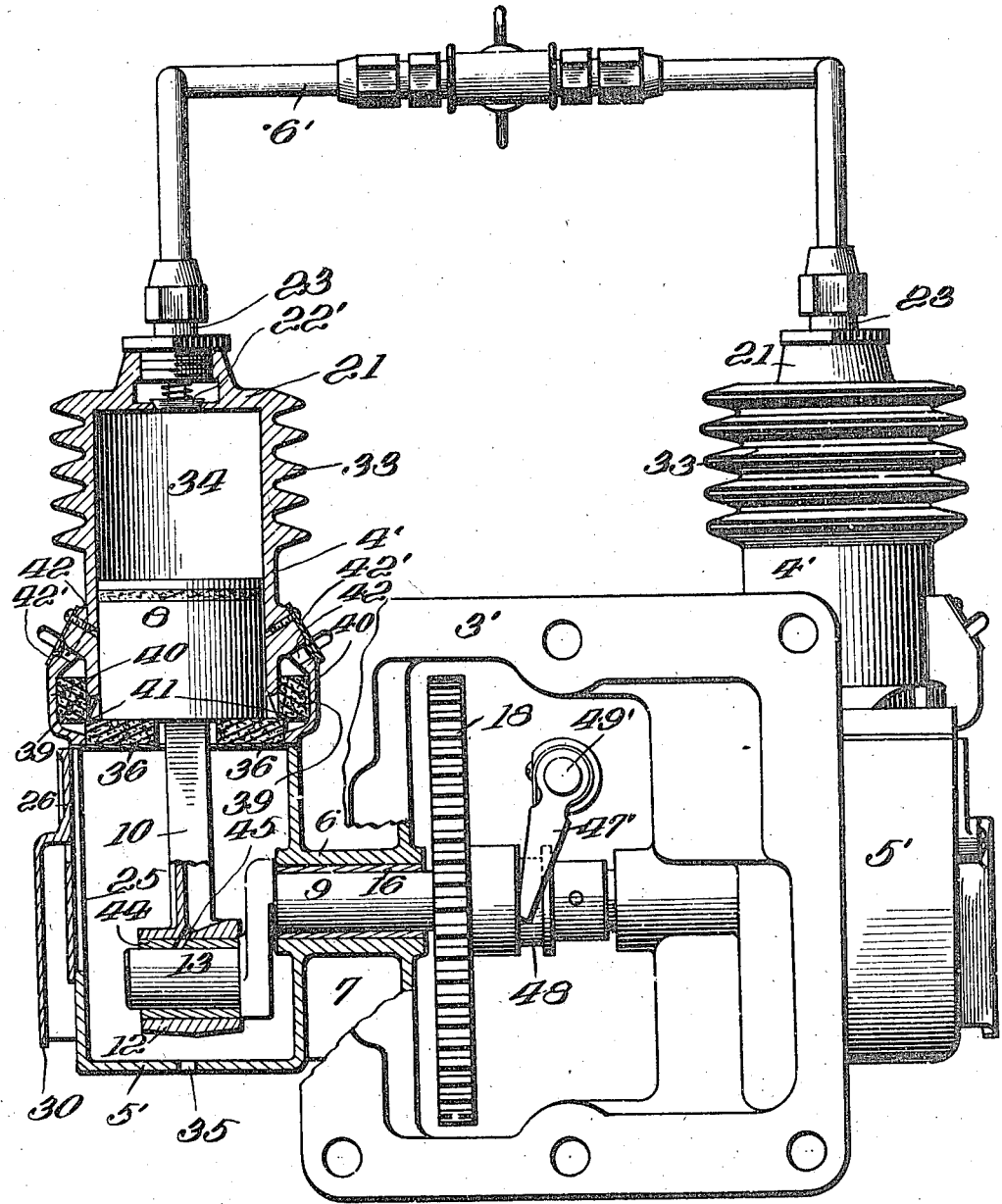

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

AUTOMOBILE-TIRE PUMP.

1,311,693.  Specification of Letters Patent.  Patented July 29, 1919.

Application filed January 14, 1918. Serial No. 211,892.

*To all whom it may concern:*

Be it known that I, GEORGE E. HAZARD, a citizen of the United States, and residing at Rochester, in the county of Monroe and State of New York, have invented certain new and useful Improvements in Automobile-Tire Pumps, of which the following is a specification, reference being had therein to the accompanying drawing.

This invention relates to improvements in automobile tire pumps, and is of that type which is operated by the engine-driven mechanism.

One of the objects of this improvement is to locate the inlet-valve in the piston head, whereby it is protected against grit, mud, dust and grease getting under it to impair its proper seating and lessening or destroying its efficiency, and which location makes the pump run cooler, because it causes a flow of air through the crank case and up through the piston, thus serving to cool these parts to a considerable extent.

Another object of this invention is to provide efficient lubrication for the moving parts of the pump in such a manner as to prevent any oil reaching the compression chamber and being sprayed or forced into the tire with its consequent injury thereto.

Another object of this invention is to combine with the cylinder a gear-housing so constructed that it is adapted to be attached to the transmission case or other suitable gear-housing of an automobile, and driven by one of the gears of the transmission or other housing gear, whereby the pump is mounted in and out of the way location, and whereby its gear, crank and gear shaft are insured of lubrication from the lubricant of the transmission case, or other housing.

Another object of this invention is to provide a shifting member for the pump gear which will extend through the floor of the car and be accessible from above the floor of the car for shifting the gear or extend to any convenient point about the car for throwing the pump in and out of operation.

Another object of this invention is to so construct the air-inlet to the crank case as to prevent the entrances of mud, grit, etc., getting therein and to any of the operating parts of the pump.

The other objects of this improved pump relate to certain specific constructions of its parts, which will be hereinafter described.

In the accompanying drawings—

Figure 1 is a perspective view of the improved pump, showing it attached to a transmission case.

Fig. 2 is a vertical central sectional view on the line 2—2 of Fig. 1.

Fig. 3 is an end view of the pump showing the air-inlet plate of the crank-case removed to expose the crank and the connecting rod of the pump.

Fig. 4 is a vertical central sectional view of the improved pump, showing it constructed for attachment to be driven by some exposed gear of the automobile mechanism.

Fig. 5 is a vertical central sectional view on the line 4—4 of Fig. 2.

Fig. 6 is a detached perspective view of the crank case air-inlet plate.

Fig. 7 is a detached perspective view of the piston felt oiling pads.

Fig. 8 is an enlarged detached perspective view of the shifting spring.

Fig. 9 is a view showing my invention applied to a two-cylinder construction.

Referring now to the drawings in which like reference letters indicate similar parts, 1 represents an automobile transmission case and 2 the floor of the automobile, just in rear of the dash.

The improved pump, as shown in Figs. 1, 2, and 3, comprises a crank-case 3, a cylinder 4 and a gear-case 5. The gear-case and the crank-case are out of communication with each other and made in one part and connected only by a bearing-box 6 and webs 7, as here shown, or then may be made of separate parts.

While it is preferred to have the crank-case 3 and gear-case 5 integral, it is of course not necessary to have them in one piece in order to have them out of communication for the purpose hereinafter described.

A hollow piston 8 is within the cylinder 4, and this piston is connected with the crank-shaft 9 by a connecting rod 10, which has its upper end 11 suitably journaled within the piston and its lower end provided with a bearing 12 embracing the crank-shaft wrist-pin 13. The said crank shaft 9 passes through the gear-case 5, and may have its outer end 14 journaled within the end of the gear-case, as shown at 15, or may depend wholly upon the bearing 16 in the box 6. This bearing 16 may or may not be a babbit bearing.

The particular form of crank arm here shown for the crank-shaft 9, forms no part of my present invention, for other well-known mechanical equivalents therefor may be used, such for instance as an eccentric operatively connected with the piston 8, without departing from the invention hereinafter claimed, and the term "crank-case" hereinafter used in the specification and claims, means the case below the cylinder, irrespective of whether it contains the form of crank-arm here shown, or some other form for reciprocating the piston.

The inner side of the gear-case 5 is open and is bolted to the transmission case 1 by suitable screws or bolts 17, so that a sliding gear 18 carried on the crank-shaft 9 will project into and engage a gear-wheel within the transmission case 1, or other automobile gear housing. It will be understood that the transmission gear-case 1 has an opening in it (not shown) into which the gear 18 projects to mesh with one of the transmission gears 19, as shown in Fig. 3.

The hollow piston 8 has in the center of its head a suitable air-inlet valve 20, and the head 21 of the cylinder 4 is provided with a suitable air-outlet valve 22, the head of the cylinder carrying also a nipple 23 for the attachment of a pipe or housing 24 for conveying the air to the tire of the automobile.

The crank-case 3 has a vertical opening 25, which extends clear to the top of said case, and this opening 25 is covered by a detachable air-inlet plate 26, secured thereto by screws (not shown) which pass through the openings 27 of the plate and into the screw-openings 28, of the crank-case. This air-inlet plate is provided with a horizontally elongated opening 29, which communicates with the interior of the crank-case 5, and a depending hood 30 is on the outside of the plate 26. The upper end of the hood embraces the air-inlet opening 29 and the hood extends down apart from the plate 26 and below its lower end. The object of this hood is to protect the air-inlet opening 29 from splashing mud, grit, etc., to prevent it from entering the crank-case.

As shown, the cylinder 4 is detachable from the crank-case 3 and it is attached thereto by suitable screw-bolts 31, which pass through a laterally extending flange 32, at the lower end of the cylinder, while the upper end of the cylinder is provided with the usual cooling ribs 33.

By having the crank-case 3, provided with the opening 25, extending to its top; providing a detachable plate therefor and making the cylinder detachable from the crank-case, the assembling and disassembling of the pump is readily accomplished, and avoids the necessity of having a two-part bearing 12, for the lower end of the connecting rod 10. It enables the piston with its connecting rod to be assembled and placed in its cylinder 4, while the cylinder is detached and then the cylinder attached to the crank-case by passing the lower end of the connecting rod through the opening 25 and on to the crank 13. It also permits ready and quick access to the crank-case for any desired purpose and readily enables the crank-case to be kept clean.

It is essential that efficient oiling be provided for the piston, and with the air-inlet passing through the crank-case, the cylinder and the piston, it is equally essential to prevent any excess lubrication, for it would find its way through the inlet valve 20 into the compression chamber 34, and finally into the tire, which would be very destructive thereto. Therefore in order to enable the air to be taken through the crank-case, the cylinder and the piston without gathering any oil, a special oiling system is provided. In the first place, the crank-case 3 is provided with a drain opening 35, which is always open, so that it is impossible to have any accumulation of lubricant within the crank-case. In the second place, a two-part baffle or separating plate 36 is located between the adjacent faces of the cylinder 4 and the crank-case 3, and this two-part plate has an elongated opening 37 in which the connecting rod 10 vibrates, and each part of the plate is provided with a lubricating felt pad 38, each of which is about one-third of a circle, and is so located and is of such a thickness that the lower end of the piston 8 slightly strikes it when in its lowermost position. In this way the piston is provided with and takes up sufficient oil for efficient lubrication between it and the cylinder. The lower end of the cylinder is provided with an oil supply pocket or pockets 39, in communication with the oil pads 38, and these pockets 39 are provided with oil-supply felt pads 40, which are in contact at their lower inner corners 41, with the pads 38. Oil is supplied to these pockets 39, through openings 42, which are provided with suitable covers for opening and closing the openings 42.

In this construction of lubrication for the pump, the connecting-rod bearing 12 is provided with a special no-oil bearing, known in the trade as the "Graphaloy" bearing 44 or any other suitable no-oil bearing. Although the connecting rod bearing is of Graphaloy composition, yet a little oil aids materially in lubricating it, and to provide a very slight lubrication for this Graphaloy composition, the lower end of the connecting-rod comes very close to the baffle-plate 36, so that any slight excess of oil at the inner edge of the two-part plate 36 will fall on the lower end of the connecting rod and pass through an opening 45 on to the crank-shaft pin 13, to slightly lubricate the said Graphaloy bearing.

Attention is particularly called to the fact that no oil is maintained in the crank-case, but to the contrary, a constant drain is provided to prevent any accumulation of oil therein, for where the air is taken through the crank-case the cylinder and the piston, there must be no surplus oil in the crank-case, or on the cylinder wall, in order to prevent any oil reaching the compression chamber and being forced therefrom into the tire.

Referring now again to the sliding gear 18, this gear is connected with the crank-shaft 9, by any suitable sliding key connection 46, or its functional equivalent and a yoke 47 is within the gear-case and straddles a grooved extension 48 in the gear 18, and the yoke 47 is firmly attached to a vertically operating rod 49, whereby the yoke is swung laterally for moving the gear 18 in and out of mesh with its coöperating gear. While I have shown the gear 18 directly in mesh with one of the transmission gears 19, I wish it understood that there may be an idle gear (not shown) between the gear 18 and one of the transmission gears in the transmission case 1. This vertically operating rod 49 passes upward through the floor 2 of the car and carries at its upper end a member 50, by which it can be operated, or the rod may extend in any other direction. This member 50 is here shown with a slot 51 to receive an ordinary screwdriver, and is preferably surrounded by a suitable floor-plate 52. An arm 53 is secured to the rod 49, just above its bearing 54, and this arm has a slot 55 into which the free end 60 of a shifting spring 61 extends, the other end of the spring 61 passing around a suitable pin 62 extending from the gear case 5. By means of this arm 53 and the shifting spring 61, the operating rod 49 is held in either of its two positions for holding the gear 18 in or out of mesh with its coöperating gear.

In Fig. 4 there is shown the improved pump, omitting the gear case 5, leaving the crank shaft 9 extending as at 9' to receive a gear (not shown) to mesh with any exposed gears (not shown) driven by the automobile engine. Where the pump is provided with a gear case 5, and connected with the transmission case, sufficient lubrication will pass into the bearing 16 to lubricate the crank shaft, but where it is not connected with the transmission case, as in Fig. 4, separate additional lubrication is provided for the crank shaft 9. In this latter instance, a pocket 63 is provided with a lubricating felt pad or packing 64, having communication with the bearing through an opening 65, and oil is supplied to this pocket through an opening 66, having a suitable swinging cover 67. In all other respects the pump shown in Fig. 4 is a duplicate of that shown in the other figures of the drawings, and all of the description of the other figures fits the construction of Fig. 4, and like reference letters to those of the other figures are applied thereto.

In Fig. 9, is shown a two-cylinder construction in which there is a crank-case 5', mounted at opposite ends of the gear-case 3', and each crank-case carrying the cylinders 4'.

The air outlets 22' are connected by a pipe 6', so that both of the cylinders 4' communicate with the pipe 6'. In all other respects this two-cylinder construction is the same as the single cylinder construction already described, and the same reference letters will be applied thereto as the description will fit this two-cylinder construction the same as the single cylinder construction.

Having thus described the invention, what is claimed is:—

1. An automobile tire pump comprising a crank-case and a cylinder mounted thereabove, the crank-case having an air-inlet opening and an open oil-outlet in its bottom, the piston having a valved air-inlet and the head of the cylinder having a valved air-outlet, the lower end of the cylinder enlarged to receive an oil saturated pad, an oil saturated pad partially within the cylinder enlargement and extending inward in the path of and engaged by the lower end of the piston, and means for supplying oil to the pad independent of the crank-case.

2. An automobile tire pump comprising a crank-case and a cylinder mounted thereon, an air-inlet opening having communication with the lower end of the cylinder, the piston having a valved air-inlet and the head of the cylinder, a valved air-outlet, the lower end of the cylinder enlarged, an oil saturated pad partially supported within the enlargement and projecting in the path of travel of and engaged by the lower end of the piston, the lower end of the cylinder also provided with an oil-supply chamber for the oil saturated pad.

3. An automobile tire pump comprising a crank-case, a cylinder mounted thereon and a piston within the cylinder, an air-inlet opening in communication with the lower end of the cylinder, the head of the piston provided with a valved air-inlet opening and the head of the cylinder provided with a valve air-outlet opening, the lower end of the cylinder enlarged outward, a saturated pad partially within the enlargement and projecting inward in the path of travel of and engaged by the lower end of the piston, the lower end of the cylinder having an outwardly extending chamber in communication with the aforesaid cylinder enlargement, said chamber having an oil saturated supply pad and also provided with an oil receiving opening whereby lubrication is provided for the piston.

4. An automobile tire pump comprising a crank-case, a cylinder mounted thereon, a piston within the cylinder, an operating crank and a connecting rod between the piston and the crank, an oiling device for the piston comprising a two-part baffle-plate located between the cylinder and the crank case, the inner edge of each baffle-plate cut out to form together an elongated opening for the travel of the connecting rod, and an oil saturated pad attached to each of the two-part baffle-plate at each side of the said opening, the said pads located in the path of travel of and engaged by the lower end of the piston.

5. An automobile tire pump, comprising a crank-case, and a cylinder mounted thereon, the crank-case having an air-inlet above its bottom protected by and embracing a hood and the crank-case having an open oil-outlet in its bottom, a piston for the cylinder, the piston having a valved air-inlet and the head of the cylinder a valved air outlet, an oil saturated pad located between the cylinder and the crank-case and in the path of and adapted to be engaged by the lower end of the piston, and an oil supply for the pad above and independent of the crank-case, all combined for the purpose described.

6. An automobile tire pump comprising a crank-case, a cylinder mounted thereon, a piston in the cylinder, a crank-shaft bearing at one side of the crank-case, a crank-shaft within the bearing and carrying a connecting rod pin, and a connecting rod connecting the piston and connecting rod pin, the cylinder detachable from and attachable to the crank-case, the crank-case having a vertically arranged opening extending to its top whereby the piston with its connecting rod may be assembled in the cylinder while it is detached from the crank-case, and the parts assembled by passing the lower end of the connecting rod through the crank-case opening and onto the connecting rod pin and securing the cylinder to the crank case.

7. An automobile driven tire pump, comprising a gear case having an open side adapted to be attached to and in communication with an automobile gear case and receive lubrication from the latter case, a crank-case closed against communication with both said gear cases to prevent receiving lubrication therefrom, a cylinder mounted on the crank-case and in communication therewith, a piston in the cylinder, a crank-shaft operatively connected with the piston and extending into the pump gear-case, and means located at the lower part of the cylinder for lubricating the piston, for the purpose described.

8. An automobile driven tire pump, comprising a gear case having an open side adapted to be attached to and in communication with an automobile gear-case and receive lubrication from the latter case, a crank-case closed against communication with both said cases to prevent receiving lubrication therefrom, a cylinder mounted on the crank-case and in communication therewith, a piston in the cylinder having a valved-air outlet into the cylinder, the crank-case having an air inlet opening for the purpose described, a crank shaft operatively connected with the piston and extending into the pump gear case, and means at the lower end of the cylinder for lubricating the piston, the parts combined for the purpose described.

9. An automobile driven tire pump, comprising a unitary structure including a gear case, having an open side adapted to be attached to and in communication with an automobile gear case and receiving lubrication from the latter case, a crank case closed against communication with both said gear cases to prevent receiving a lubricant therefrom, a cylinder mounted on the crank case, a piston in the cylinder, a crank shaft operatively connected with the piston and extending into the pump gear case, and means for lubricating the piston independently of the pump gear case, for the purpose described.

10. An automobile driven tire-pump, comprising a crank-case, a cylinder mounted thereon, a piston within the cylinder, a pump gear-case having an open side adapted to be attached to and in communication with an automobile gear-case and receive lubricant therefrom, a crank-shaft operatively connected with the piston and extending into the gear-case, a closure wall between said cylinder and both of said gear cases for the purpose described, and means communicating within the cylinder for lubricating the piston.

In testimony whereof I hereunto affix my signature in the presence of two witnesses.

GEORGE EDGAR HAZARD.

Witnesses:
 MORTIMER R. AUSTIN,
 BURRITT H. BLAKESLEE.